Aug. 20, 1929.  L. W. LESSLER ET AL  1,725,460
PHOTOGRAPHIC CAMERA
Filed March 13, 1926  3 Sheets-Sheet 1
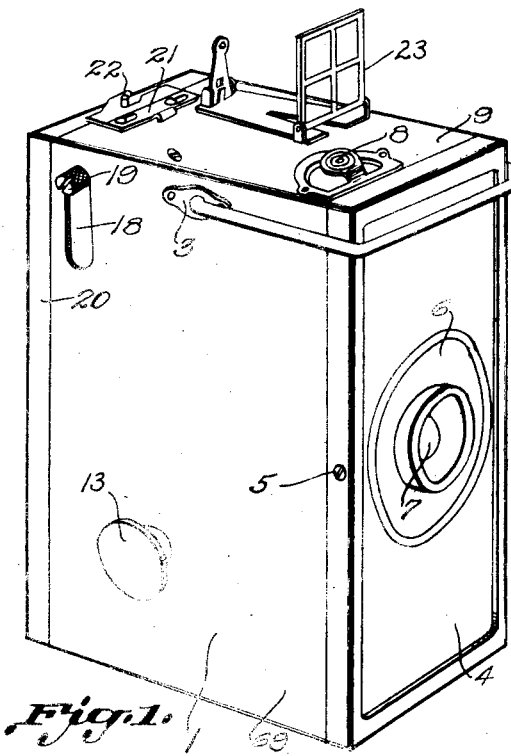
Inventors
LEW W. LESSLER &
CARL A. BORNMANN
By Philip S. Hopkins
Attorney

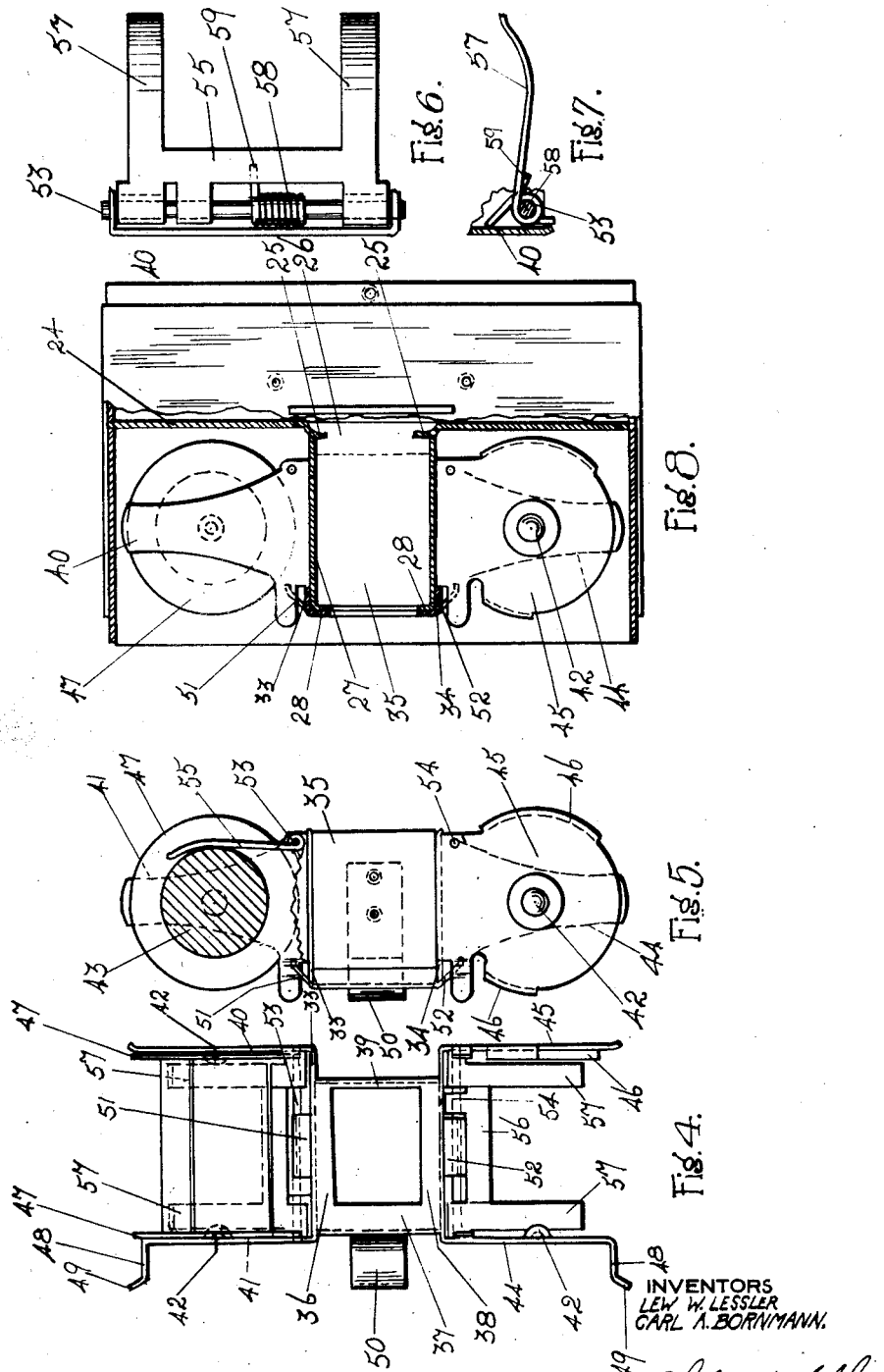

Aug. 20, 1929.  L. W. LESSLER ET AL  1,725,460
PHOTOGRAPHIC CAMERA
Filed March 13, 1926   3 Sheets-Sheet 3
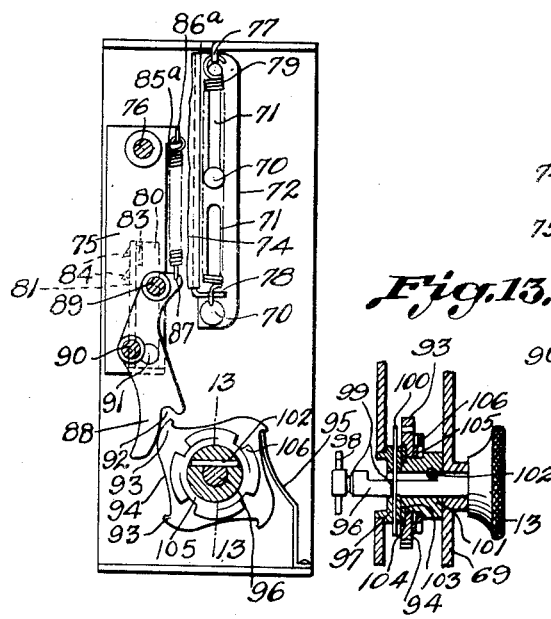
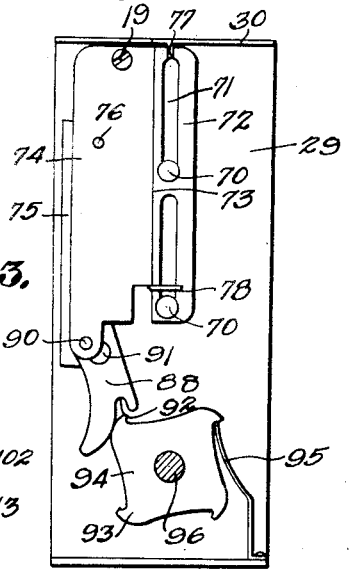
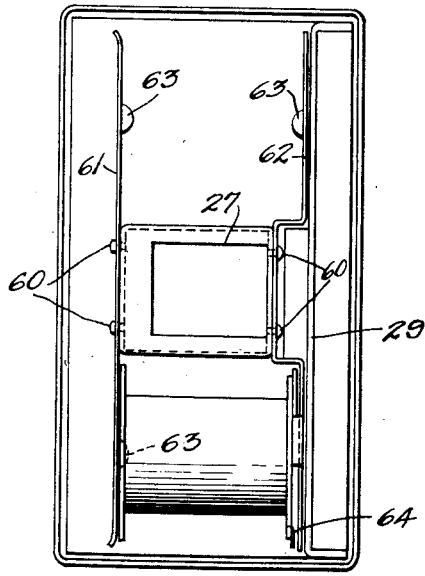
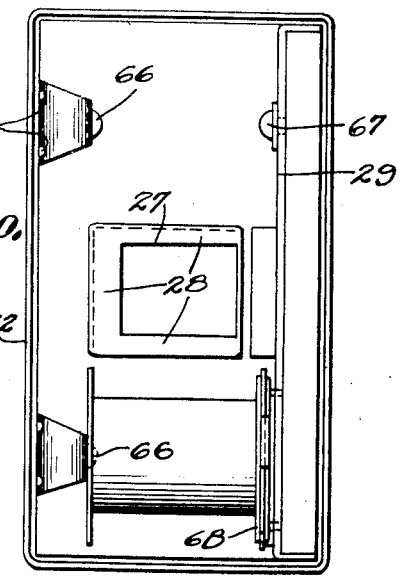
Inventors
LEW W. LESSLER &
CARL A. BORNMANN.
By Philip S. Hopkins
Attorney.

Patented Aug. 20, 1929.

1,725,460

UNITED STATES PATENT OFFICE.

LEW W. LESSLER, OF JOHNSON CITY, AND CARL A. BORNMANN, OF BINGHAMTON, NEW YORK, ASSIGNORS, BY MESNE ASSIGNMENTS, TO AGFA ANSCO CORPORATION, OF BINGHAMTON, NEW YORK, A CORPORATION OF NEW YORK.

PHOTOGRAPHIC CAMERA.

Application filed March 13, 1926. Serial No. 94,496.

Our invention relates to photographic cameras, and particularly to a camera which is adapted to take comparatively small pictures on a long length of film. Cameras of this type are especially useful for recording pictorially any particular event or series of events wherein it is desired to take a great many pictures in succession and in sequence without being required to stop every little while and change the film in the camera. In other words, the camera, though small in construction, is provided with means to accommodate a roll of film upon which may be exposed 50 or 100 or even more pictures at one loading.

The ordinary standard moving picture or cinema film is preferably used in this improved camera, although of course the camera need not be limited to such film. The pictures procured by this camera are especially adapted for reprinting on a second strip of positive film, from which they may be projected upon a screen in an enlarged form by any suitable projecting lantern.

The uses to which a camera of this type may be put are almost innumerable and include the recording of parades, trips, parties, the picturing of the progress of a manufacturing product through its various processes, natural phenomenæ, and in short any subject matter wherein a great many consecutive pictures of different scenes or positions are required and which must be taken in rapid succession and which do not permit time necessary with the ordinary camera to the changing and reloading of the film. A camera of this type is invaluable, also for educational purposes in that natural history, current events and other features of interest to students may be recorded with this camera and projected upon a screen in the class room for study or entertainment.

Many features and objects enter into the design and construction of this camera, in order to make it compact, simple in construction and operation, so that it can be manipulated by an inexperienced operator, and which is small, compact, easy and light to carry, and at the same time have sufficient room for the operating parts and for the roll of film.

Among the objects of this invention is included the provision of a suitable carriage or mounting for the film spools. This carriage renders the camera easily loaded, as it is removable entirely from the body of the camera, and is simple to operate.

Many other details on this camera are the results of further objects and advantages of the invention and contribute to the production of a small, compact, flexible, simple operating efficient picture-taking machine of the character described, and include, a presser pad for the film, spring spoons for the film spools and many other details in construction and operation which will be apparent as the description proceeds, reference being had to the accompanying drawing wherein like reference numerals indicate like parts.

In the drawing:

Figure 1 is a perspective view of my improved camera assembled.

Figure 2 is a rear view of the camera with the back removed showing the winding part in assembled position and illustrating in dotted lines the film within the camera.

Figure 3 is a plan view of the inside of the back and illustrating the presser foot for engaging the film.

Figure 4 is a detail face view of the spool carriage or mount with a film spool mounted in one end.

Figure 5 is a side view of the structure shown in Figure 4.

Figure 6 is a plan view of the spring spoon or finger which is mounted within the spool carriage and which engages frictionally with the spool carried thereby.

Figure 7 is a side view of the structure shown in Figure 6.

Figure 8 is a side view of the camera with parts broken away showing the spool carriage mounted within the camera.

Figures 9 and 10 are rear views of the camera with the back removed showing modified forms of spool carriages and methods of mounting or securing the same within the body of the camera.

Figure 11 is a detail side view showing the winding mechanism for the film.

Figure 12 is a similar detail side view of the same mechanism certain parts being omitted for clearness in illustration.

Figure 13 is a detail sectional view taken on the line 13—13 of Figure 11.

Figure 14 is a detail perspective view of the partition or division plate which separates the winding mechanism from the spool carriage in the camera.

Figure 15 is a side view of the camera, parts being broken away to show in assembled relation the spool carriage within the camera and the operation of the presser foot carried by the back, on the film as it is wound through the camera.

Referring now more particularly to Figure 1 of the drawing wherein we have indicated generally our improved camera by the reference numeral 1, 2 represents the carrying handle therefor, suitably secured to either side of the camera as by means of brackets 3. The front plate 4 of the camera, is secured to the body as by means of screws 5 and is provided centrally with a cover piece 6 surrounding an opening 7 through which the exposure is made. The upper end 8 of the shutter operating lever projects through an opening in the top 9 of the camera for ready manipulation. The button 13 is the outer end of a key pin for co-operation with the film spool, the details of which will be described later.

Near the upper rear corner of one side of the camera, is provided a recess 18 which is elongated vertically to provide a pathway for the projecting end 19 of the lever which controls the film winding mechanism.

The back 20 of the camera is held in position by means of the sliding catch 21, carried by the top of the camera and cooperating with the pins 22 carried by the back.

A collapsible direct view finder 23 is mounted on top of the camera for the proper location and centering of the objects to be photographed.

It will be noted now with particular reference to Figure 8, that the camera box is divided into two main front and rear compartments by a partition 24 extending across the body at a point slightly forward of the central portion of the box and parallel with the front 4 and back 20. This partition is provided centrally thereof with a circular boss 25 (see Figure 8) having a central aperture 26 in register with the opening 7 in the front of the camera. Mounted in any suitable manner upon the boss 25 of the partition 24, and extending rearwardly thereof to a point adjacent the rear of the camera is a rectangular housing 27, closed on all four sides and open at the ends. Flanges 28 are turned inwardly towards each other at the rear of the housing, and the aperture formed by said flanges defines the size of the picture or exposure which may be made upon the film. The light, of course, passes through the aperture 26, and through the housing 27 to the film.

Referring now to Figure 2 of the drawing, it will be seen that a second partition plate 29 is provided adjacent one side of the camera body, and extends at right angles to the partition 24 and rearwardly therefrom to the back edge of the camera. The upper and lower edges 30 and 31 of this partition plate are turned at right angles whereby the plate is suitably spaced from the adjacent side of the camera. These spacing flanges 30 and 31 also act as light locks against the admission of light to the film chamber through the opening 18 in the side of the camera.

The spaces formed above and below the housing 27 and between the partition plate 29 and the opposite side 32 of the camera body provide room for the film spools and the means for holding them.

The spool carriage illustrated in Figures 4, 5 and 8 comprises primarily a rectangular three sided housing having a top, 33, a bottom 34, and a side 35. The side of the housing adjacent the partition plate 29 is omitted, the plate itself acting as such side.

Flanges 36, 37, 38 and 39 (Figure 4) are provided at the outer end of the housing, these flanges defining an aperture or opening identical in size with that defined by the flanges 28 of the housing 27. This spool carriage housing is adapted to slide telescopically over the fixed housing 27 within the camera, as shown clearly in Figure 8.

The sides of the top 33 of the spool carriage housing are formed upwardly at right angles thereto, providing resilient spring arms 40 and 41, each provided with an indented pin 42, or other suitable means to provide a spool pin for engaging within the usual opening in the ends of the spool 43. As shown in Figures 5 and 8, these arms 40 and 41 are reduced in width near their upper ends, thus reducing the weight thereof and increasing their resiliency.

The bottom piece 34 of the spool carriage housing, also, has its sides formed downwardly to provide spool securing means. One of these downwardly extending arms 44, mounted on the same side as the spring arm 41, is also provided with the indented spool pin 42, while the opposite arm 45 takes the form of a circular cup provided with flanges 46 extending partially around the periphery thereof to receive the flange 47 of one of the spools. The outer end of the spring arms 41 and 44 are bent outwardly at right angles as at 48 and then offset as at 49, providing a resilient spacing means for the spool carriage from the side 32 of the camera. It will be understood also that with this construction, the side 32 of the camera normally forces the spring arms 41 and 44 inwardly to their spool engaging position, thus rendering it impossible for the spools to become disengaged from the spool pins 42, while the carriage is within the camera. When the carriage is removed however, the spring arms 41 and 44 may be sprung outwardly a sufficient distance to remove the spools therefrom. An auxiliary spacing member 50 is also secured to the side 35 of the carriage for engagement with the side wall 32 of the camera.

Guides 51 and 52 are provided on opposite sides of the aperture defined by the outer flanges of the housing for the purpose of guiding the film from the spools over the ends of said housing.

The inner edges of the spring arms 40, 41, 44 and 45 are provided adjacent their inner ends, with bearings for the pintles 53 and 54 upon which are pivoted the spring spoons or fingers for engaging the film spool. These spoons are designated as 55 and 56, and include resilient curved fingers 57 (see Figure 6) extending outwardly adjacent the spring arm supporting the spools. A coil spring 58 encircles the pivot pin or pintle and has one end anchored against the adjacent spring arm and the opposite end engaging the spoon or finger as at 59, and acting to normally force the same into contact with the film spool.

It will be seen from the foregoing description, that the spool carriage, which for the most part is in one piece, stamped from sheet metal and formed as above described, is slipped over the housing 27 within the camera body. It is guided to and occupies the proper position for permitting the film to be drawn from one spool, past the focal plane at the end of the housing, to the take up spool.

Figures 9 and 10 show modified forms of spool carriage construction. In Figure 9, the housing 27 carries on either side, as by rivets or other suitable means 60, continuous spring arms 61 and 62. It will be noted from Figure 9 that these spring arms are secured to the housing at their central portions, leaving the ends thereof free and resilient to engage and hold the spools. The arm 61 is provided adjacent each end with indented pins 63, acting as spool pins. The spring arm 62 also carries at its upper end a similar spool pin 63 and at its lower free end, a flanged cup 64 similar to the cup 45 shown in Figures 4 and 5.

Figure 10 shows a still further form of spool carriage construction and in this form the side or wall 32 of the camera box supports as at 65, spring brackets carrying the usual spool pins 66 at their inner ends for engaging the ends of the spool. It will be noted that these spring brackets extend inwardly to a point which will position the spools centrally over the housing 27. In this form the partition 29 carries near its upper end a spool pin 67 rigidly mounted on said partition, and at the lower end a flanged cup 68 is mounted to receive one of the flanges of the film spool. These figures 9 and 10 merely illustrate two of the many types and modifications of the spool carriage which may be used in this camera.

The space between the partition 29 and the side wall 69 of the camera body provides a compartment for the mechanism which winds the film from one spool to the other. This mechanism is illustrated generally in Figures 2, 11, 12 and 15 and will be briefly described. Referring now to Figure 12 of the drawing, it will be noted that upon the inner side of the partition plate 29, there is slidably mounted, as by means of a pin and slot connection 70 and 71, the reciprocating slide 72. This slide is offset as at 73 so that the portion 74 of the slide is spaced from the partition plate 29, as illustrated clearly in Figure 2. Another slide 75 parallel with the portion 74 and secured thereto pivotally as at 76, lies flush against the inner surface of the partition 29. This is clearly shown in Figures 11 and 12. An ear 77 is turned downwardly from the upper flange 30 of the partition plate 29 and a second ear 78 is formed on the slide 72. A coil spring 79 has an end secured to each of these ears and normally holds the slide 72 with its offset portion 74 and the slide 75 in their uppermost position. The screw 19, shown in Figure 1, is positioned at the upper end of the slide 74, and projects outwardly through the recess 18 in the side of the camera box. It is by means of this screw that the slide 74 is manipulated by the operator in a manner to wind the film from one spool to the other.

It should be noted here that the partition plate intermediate its ends, and at a point opposite the housing in Figure 15, is provided with a cut out portion 80 of about the same length as the height of the housing. The material from this cut out portion is bent outwardly at right angles forming a guide 81 (see Figure 14). The slide 75 carries an outstanding lug or arm slidable along the surface of the guide 81. This lug is indicated by reference character 82 and has its free end bent at right angles over and projecting beyond the edge of the guide 81. This free end 83 is provided with spaced teeth 84 adapted to engage within the perforations 85 of the film 86 and upon reciprocation of the slide 75 to draw said film downwardly from the upper spool. The slide 75 is pivotally mounted to the slide 74 at the point 76 and is normally maintained in its outward or film engaging position by means of the coil spring 85$^a$ secured at one end to the lug 86$^a$ carried by the slide 75 above its pivot, and secured at its lower end to the upper free end 87 of a pivoted lever or dog 88. (See Figure 11.) It will be noted that the upper sides of the teeth 84 are beveled and as the slide 75 is carried upwardly on its return stroke by the spring 79, these beveled edges of the teeth 84 engage the film between the perforation and are forced inwardly thereby, past the edge of the guide 81 until the slide 75 reaches its normal position, whereupon the teeth 84 will be forced into engagement with an adjacent pair of perforations in the film, the spring 85ª causing such engagement.

As disclosed in Figures 3 and 15, the back 20 of the camera is provided with a longitudinal leaf spring 85ᵇ, guided by pins 85ᶜ. The spring carries centrally a presser pad 86ᵇ which engages resiliently against the film 86 as it passes over the end of housing 27 of the spool carriage. An elongated slot 86ᶜ is provided along one edge of the presser pad, through which passes the teeth 84.

The lever 88 is pivoted to the slide 74 at 89, and is guided in its pivotal movement by a pin 90 operating in a slot 91 in said lever. It will be noted with reference to Figure 11 the coil spring 85ª engaging with the free end 87 of this lever operates to normally hold the lower end of the lever inwardly, or to the right. The lower end of the lever 88 is provided with a recess 92 for engaging one of the teeth 93 of a rotatable disk 94. A flat leaf spring 95 or other suitable means is provided to engage the disk 94 to prevent free rotation and to prevent it turning in but one direction.

The disk 94 is rotatably and slidably mounted upon a shaft 96, terminating at its outer end, after passing through the side of the camera, in the turn button 13 as shown in Figure 1. Referring now to Figure 13, it will be noted that the partition 29 is provided with a bushing 97 having a central opening through which passes the shaft 96. The shaft 96 carries at its inner end a key pin 98 for engaging within the key slot in the adjacent end of the film spool, whereby upon rotation of the shaft 96, said spool will also be rotated. The shaft 96 is also provided adjacent its inner end with shouldered recesses 99, within which engages a small resilient spring 100, whereby said shaft is frictionally held in its spool engaging or disengaging position. A shouldered bushing 101 is keyed to the shaft 96 as at 102 for rotary motion therewith and to permit sliding motion of the shaft 96 with respect thereto. Between one of the shoulders 103 of this bushing, and a washer 104, is rotatably mounted the disk 94. Also secured upon the bushing 101 and having frictional engagement against the outer face of the disk 94, is a spring washer 105. This washer, is clearly shown in Figure 11 and is provided with integral resilient spring tongues 106, which bear against and act as a brake upon the disk 94.

This friction arrangement permits a slippage between the driving disk 94 and the film spool whereby to compensate the varying diameter of the take up spool as the film is wound thereon. In other words, this connection prevents more than the required amount of film being wound upon the take up spool as said spool is rotated through the disk 94.

It will be apparent that when the operator presses downwardly upon the pin 19, the slide 72 together with the slides 75 and 74 will be moved downwardly, and during which movement the teeth 84 carried by the slide 75 will engage and pull downwardly a section of film equal to the width of an exposure. At the same time the pivoted lever 88 will engage with the disk 94, which because of its frictional engagement with the shaft 96 will rotate the spool to take up the film so pulled down. The spring 79 will then return the slides to their normal position.

Of course many changes in details of construction and operation may be made from the forms shown and described herein without departing from the scope of the invention. We do not limit ourselves therefore to the exact construction shown other than by the appended claims.

We claim:—

1. A camera including in combination an outer box, a film carriage therein, means for advancing a perforated film in said box comprising a slide guided in said box, means normally urging said slide in one direction, a finger piece on said slide extending through one side of said box, a plate pivotally mounted on said slide provided with spaced teeth for engaging the perforations of said film, said teeth being offset from and parallel to, said plate, and means resiliently urging said plate to film engaging position.

2. A camera including in combination an outer box, a partition therein dividing the same into two compartments, a film carriage in one compartment carrying a film, film advancing means in the other compartment comprising a slide guided on said partition a finger piece on said slide extending through one side of said box, and means carried by said slide and projecting through said partition, for engaging said film, said means comprising a plate pivoted to said slide and having teeth carried thereby and extending through said partition to film engaging position.

3. A camera including in combination an outer box, a partition therein dividing the same into two compartments, a film carriage in one compartment carrying a film, film advancing means in the other compartment comprising a slide guided on said partion, a finger piece on said slide extending through one side of said box, and means carried by said slide and projecting through said partition, for engaging said film, said means comprising a plate pivoted to said slide and having teeth carried thereby and extending through said partition to film engaging position, and means resiliently urging said teeth to such engaging position.

4. A camera including in combination an outer box, a partition therein dividing the same into compartments, a film carriage in one compartment provided with film supply and take up spools, film advancing means in the other compartment comprising a slide provided with means extending through said partition to film engaging position, a winding key extending through said partition for engaging said take up spool, and means on said slide for rotating said winding key.

5. A camera including in combination an outer box, a fixed housing disposed centrally therein and having open ends, a removable film carriage supported by said housing and provided with means for spacing said carriage in relation to said housing and the wall of said box.

6. A camera including in combination an outer box, a fixed housing therein and having open ends, a film carriage removably supported by said hosing comprising resilient spool supports at each end and a central portion fitting over one end of said housing.

7. A camera including in combination an outer box, a fixed housing therein and having open ends, a film carriage removably supported by said housing comprising resilient spool supports at each end and a central portion fitting over one end of said housing, said central portion being flanged to define an exposure aperture at one open end of said housing.

8. A camera including in combination an outer box, a fixed housing therein and having open ends, a film carriage removably supported by said housing comprising resilient spool supports at each end and a central portion fitting over one end of said housing, said central portion being flanged to define an exposure aperture at one open end of said housing, and film guides on said carriage adjacent said aperture.

9. A camera including in combination an outer box, a fixed housing therein having open ends, a film carriage removably supported by said housing and having resilient spool supports at its ends and a central portion fitting over one end of said housing, said central portion being flanged to define an aperture at one open end of said housing, film spools in said support, and means in said camera adjacent said housing in film engaging position for moving a film past said aperture.

10. A camera including in combination an outer box, a fixed housing therein having open ends, a film carriage removably supported by said housing and having resilient spool supports at its ends and a central portion fitting over one end of said housing, said central portion being flanged to define an aperture at one open end of said housing, film spools in said supports, film guides adjacent said central portion, and means in said camera adjacent said housing and in film engaging position for moving a film past said aperture.

11. A camera including in combination an outer box, a fixed housing therein having open ends, a film carriage removably supported by said housing and having resilient spool supports at its ends and a central portion fitting over one end of said housing, said central portion being flanged to define an aperture at one open end of said housing, said spool supports being offset at one side with relation to said central portion, film spools in said supports, and film moving means in said camera adjacent said housing including reciprocating teeth in film engaging position whereby a film may be moved past said aperture.

12. A camera including in combination an outer box, a fixed housing therein having open ends, a film carriage removably supported by said housing and having resilient spool supports at its ends and a central portion fitting over one end of said housing, said central portion being flanged to define an aperture at one open end of said housing, said spool supports being offset at one side with relation to said central portion, film spools in said supports, and film moving means in said camera adjacent said housing including reciprocating teeth in film engaging position, whereby a film may be moved past said aperture, a back for said camera box, a presser pad resiliently mounted thereon and engageable against a film as it passes over said aperture, said presser pad having a slot through which said reciprocating teeth may extend.

LEW W. LESSLER.
CARL A. BORNMANN.